United States Patent
Park et al.

(10) Patent No.: US 8,824,356 B2
(45) Date of Patent: Sep. 2, 2014

(54) APPARATUS FOR TRANSMITTING AND RECEIVING CONTROL INFORMATION AND SYSTEM INFORMATION FOR REPEATERS AND METHOD THEREOF

(75) Inventors: Kyu Jin Park, Anyang-si (KR); Sung Ho Moon, Anyang-si (KR); Yeong Hyeon Kwon, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 125 days.

(21) Appl. No.: 13/387,355

(22) PCT Filed: Jul. 26, 2010

(86) PCT No.: PCT/KR2010/004883
§ 371 (c)(1),
(2), (4) Date: Jan. 26, 2012

(87) PCT Pub. No.: WO2011/013962
PCT Pub. Date: Feb. 3, 2011

(65) Prior Publication Data
US 2012/0120868 A1 May 17, 2012

Related U.S. Application Data

(60) Provisional application No. 61/228,604, filed on Jul. 26, 2009.

(30) Foreign Application Priority Data

Jul. 26, 2010 (KR) .......................... 10-2010-0071840

(51) Int. Cl.
*H04B 7/14* (2006.01)
*H04L 5/00* (2006.01)
*H04B 7/26* (2006.01)
*H04L 27/26* (2006.01)

(52) U.S. Cl.
CPC .......... *H04B 7/2606* (2013.01); *H04L 27/2601* (2013.01); *H04L 5/0053* (2013.01)
USPC ....................................... 370/315

(58) Field of Classification Search
CPC ................................. H04W 88/04; H04B 7/15
USPC ..................................... 370/315, 329; 455/450
See application file for complete search history.

(56) References Cited

U.S. PATENT DOCUMENTS 6,201,970 B1 * 3/2001 Suzuki et al. ................ 455/450
7,639,639 B2 * 12/2009 Herdin .......................... 370/315

(Continued)

FOREIGN PATENT DOCUMENTS

EP    1973262   *  3/2008
EP    1916782      4/2008

(Continued)

OTHER PUBLICATIONS

3GPP TS 36.213 ver. 8.4.0 Rel. 8, Nov. 2008.*

(Continued)

*Primary Examiner* — Mark Rinehart
*Assistant Examiner* — Peter Solinsky
(74) *Attorney, Agent, or Firm* — Lee, Hong, Degerman, Kang & Waimey

(57) ABSTRACT

The present invention provides an apparatus for transmitting and receiving control information and system information for repeaters and a method thereof. According to the present invention, a base station apparatus is provided for transmitting control information for repeaters, wherein a transmitter transmits, to each repeater, interleaving mode information and information on resource areas in which R-PDCCHs (Relay-Physical Downlink Control Channel) of each repeater are allocated. The information on the resource areas includes the control information for each repeater, and the interleaving mode information is related to the interleaving modes which are applied to the R-PDCCHs that are allocated to each repeater. Furthermore, a processor performs a control operation so that among the R-PDCCHs of each repeater, and R-PDCCH of a first repeater can be allocated with an R-PDCCH of another repeater at a first interleaving mode in a first resource area and an R-PDCCH of a second repeater can be allocated at a second interleaving mode in a second resource area.

24 Claims, 9 Drawing Sheets

(56) References Cited

U.S. PATENT DOCUMENTS

| | | | |
|---|---|---|---|
| 7,751,776 B2 * | 7/2010 | Fujita | 455/7 |
| 7,813,374 B2 * | 10/2010 | Moorti et al. | 370/466 |
| 7,881,257 B2 * | 2/2011 | Fauconnier et al. | 370/329 |
| 8,009,782 B2 * | 8/2011 | Baumgartner et al. | 375/351 |
| 8,031,670 B2 * | 10/2011 | Johansson et al. | 370/330 |
| 8,130,714 B2 * | 3/2012 | Kang et al. | 370/329 |
| 2003/0123471 A1 * | 7/2003 | Menzel et al. | 370/442 |
| 2005/0073978 A1 * | 4/2005 | Kim et al. | 370/335 |
| 2007/0097916 A1 * | 5/2007 | Eyuboglu et al. | 370/329 |
| 2008/0070611 A1 | 3/2008 | Yi et al. | |
| 2010/0118800 A1 * | 5/2010 | Kim et al. | 370/329 |
| 2010/0135237 A1 * | 6/2010 | Papasakellariou et al. | 370/329 |
| 2010/0182916 A1 * | 7/2010 | Drewes et al. | 370/252 |
| 2010/0232346 A1 * | 9/2010 | Yu et al. | 370/315 |
| 2010/0254301 A1 * | 10/2010 | Blankenship et al. | 370/315 |
| 2010/0281323 A1 * | 11/2010 | Wang et al. | 714/748 |
| 2010/0322147 A1 * | 12/2010 | Liu et al. | 370/315 |
| 2011/0103295 A1 * | 5/2011 | Khandekar et al. | 370/315 |
| 2011/0164550 A1 * | 7/2011 | Chen et al. | 370/315 |
| 2011/0194412 A1 * | 8/2011 | Park et al. | 370/241 |
| 2011/0273996 A1 * | 11/2011 | Kim et al. | 370/242 |
| 2011/0310778 A1 * | 12/2011 | Seo et al. | 370/280 |
| 2012/0002596 A1 * | 1/2012 | Kim et al. | 370/315 |
| 2012/0002598 A1 * | 1/2012 | Seo et al. | 370/315 |
| 2012/0033608 A1 * | 2/2012 | Seo et al. | 370/315 |
| 2012/0033650 A1 * | 2/2012 | Ahn et al. | 370/336 |
| 2012/0039182 A1 * | 2/2012 | Zhou et al. | 370/241 |
| 2012/0044857 A1 * | 2/2012 | Kim et al. | 370/315 |
| 2012/0063400 A1 * | 3/2012 | Papasakellariou et al. | 370/329 |
| 2012/0069790 A1 * | 3/2012 | Chung et al. | 370/315 |
| 2012/0069793 A1 * | 3/2012 | Chung et al. | 370/315 |
| 2012/0087346 A1 * | 4/2012 | Lee et al. | 370/335 |
| 2012/0099518 A1 * | 4/2012 | Park et al. | 370/315 |
| 2012/0099519 A1 * | 4/2012 | Kim et al. | 370/315 |
| 2012/0099520 A1 * | 4/2012 | Kwon et al. | 370/315 |
| 2012/0108255 A1 * | 5/2012 | Jo et al. | 455/450 |
| 2012/0113884 A1 * | 5/2012 | Park et al. | 370/312 |
| 2012/0120868 A1 * | 5/2012 | Park et al. | 370/315 |
| 2012/0121028 A1 * | 5/2012 | Kim et al. | 375/259 |
| 2012/0128039 A1 * | 5/2012 | Kim et al. | 375/211 |
| 2013/0012119 A1 * | 1/2013 | Ma et al. | 455/9 |
| 2013/0028238 A1 * | 1/2013 | Kim et al. | 370/336 |
| 2013/0064184 A1 * | 3/2013 | Ishii | 370/328 |
| 2013/0070628 A1 * | 3/2013 | Natarajan et al. | 370/252 |
| 2013/0107845 A1 * | 5/2013 | Pi et al. | 370/329 |
| 2013/0235753 A1 * | 9/2013 | Kovacs et al. | 370/252 |
| 2013/0242882 A1 * | 9/2013 | Blankenship et al. | 370/329 |

FOREIGN PATENT DOCUMENTS

| | | |
|---|---|---|
| WO | 02/03600 | 1/2002 |
| WO | 2008/133415 | 11/2008 |

OTHER PUBLICATIONS

3GPP TS 36.321 ver. 8.4.0 Rel. 8, Jan. 2009.*
3GPP TS 36.212 ver. 8.4.0 Rel. 8, Nov. 2008.*
3GPP TS 36.211 ver. 8.4.0 Rel. 8.*

* cited by examiner

FIG. 4
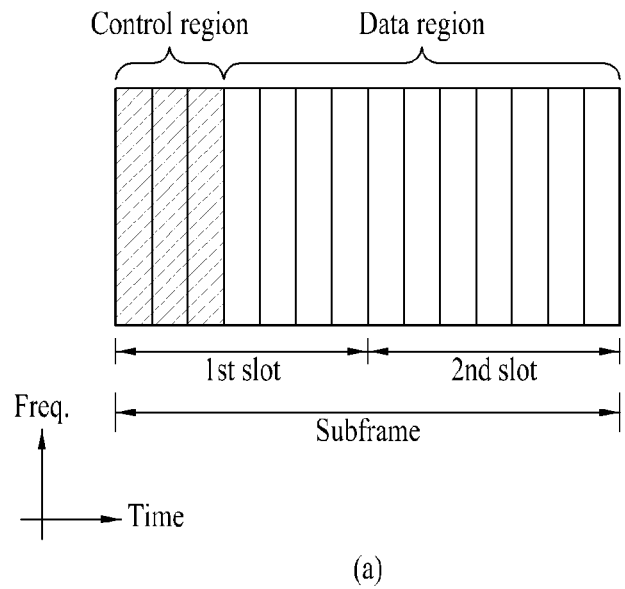
(a)
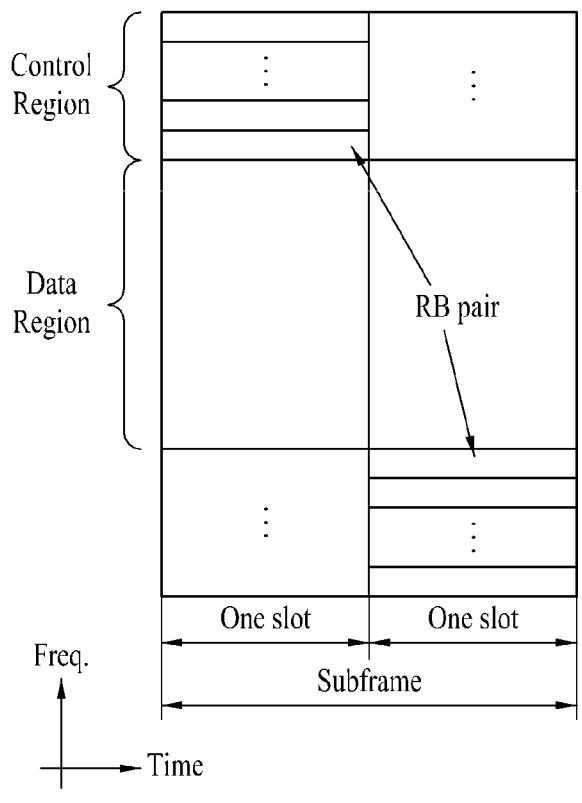
(b)

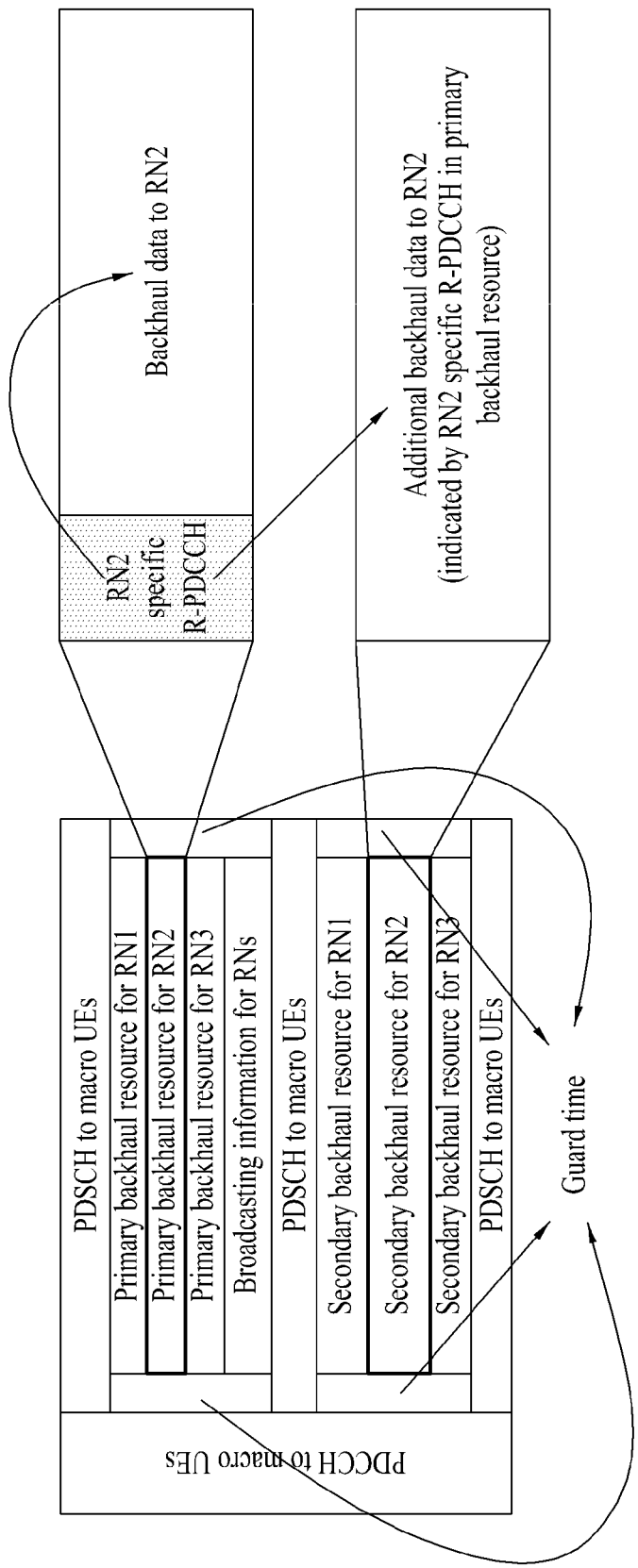

APPARATUS FOR TRANSMITTING AND RECEIVING CONTROL INFORMATION AND SYSTEM INFORMATION FOR REPEATERS AND METHOD THEREOF

CROSS-REFERENCE TO RELATED APPLICATIONS

This application is the National Stage filing under 35 U.S.C. 371 of International Application No. PCT/KR2010/004883, filed on Jul. 26, 2010, which claims the benefit of earlier filing date and right of priority to Korean Application No. 10-2010-0071840, filed on Jul. 26, 2010, and also claims the benefit of U.S. Provisional application Ser. No. 61/228,604, filed on Jul. 26, 2009, the contents of which are all incorporated by reference herein in their entirety.

TECHNICAL FIELD

The present invention relates to a wireless communication system, and more particularly, to an apparatus for transmitting and receiving control information and system information for a relay node and method thereof.

BACKGROUND ART

In the following description, 3GPP LTE ($3^{rd}$ generation partnership projecting long term evolution, hereinafter abbreviated LTE) communication system and 3GPP LTE-Advanced (hereinafter abbreviated LTE-A) communication system are schematically explained for example of a mobile communication system to which the present invention is applicable.

FIG. 1 is a schematic diagram of E-UMTS network structure for example of a mobile communication system.

Referring to FIG. 1, E-UMTS (evolved universal mobile telecommunications system) is the system evolved from a conventional UMTS (universal mobile telecommunications system) and its basic standardization is currently in progress by 3GPP. Generally, E-UMTS can be called LTE (long term evolution) system. Details of the technical specifications of UMTS and E-UMTS may refer to Release 7 and Release 8 of '$3^{rd}$ generation partnership project: technical specification group radio access network'.

Referring to FIG. 1, E-UMTS consists of a user equipment (UE), an eNode B (eNB) and an access gateway (AG) provided to an end terminal of a network (E-UTRAN) to be connected to an external network. The eNode B is able to simultaneously transmit multi-data streams for a broadcast service, a multicast service and/or a unicast service.

At least one or more cells exist in one eNode B. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. The eNode B controls data transmissions and receptions for a plurality of user equipments. The eNode B sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the eNode B sends uplink scheduling information on uplink (UL) data to a corresponding user equipment to inform the corresponding user equipment of time/frequency region available for the corresponding user equipment, coding, data size, HARQ relevant information and the like. An interface for user or control traffic transmission is usable between eNode Bs. A core network (CN) may consist of an AG, a network node for user registration of a user equipment and the like. The AG manages mobility of the user equipment by a unit of TA (tracking area) including a plurality of cells.

The wireless communication technology has been developed up to LTE based on WCDMA (wideband code division multiple access) but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

Recently, 3GPP is working on the standardization of the next technology for LTE. In the present specification of the present invention, the next technology shall be named 'LTE-Advanced' or 'LTE-A'. Major differences between the LTE system and the LTE-A system lie in a system bandwidth difference and a relay introduction. The LTE-A system has a goal to support a broadband of maximum 100 MHz. For this, the LTE-A system uses carrier aggregation or bandwidth aggregation to achieve a broadband using a plurality of frequency blocks. The carrier aggregation enables a plurality of frequency blocks to be used as one large logic frequency band to use a wider frequency band. A bandwidth of each frequency block can be defined based on a system block used by the LTE system. And, each frequency block is transmitted using a component carrier.

However, as mentioned in the foregoing description, the LTE-A system having introduced the relay node does not have any study for resource allocation to transmit control information for the relay node and resource allocation to transmit system information (or broadcast information) for the relay node. And, any method for an eNode B to signal the control information for the relay node, the resource allocation information on a broadcast information carrying resource and the like has not been proposed in detail yet.

DISCLOSURE OF THE INVENTION

Technical Tasks

Accordingly, the present invention is directed to substantially obviate one or more problems due to limitations and disadvantages of the related art. First of all, an object of the present invention is to provide a method of transmitting control information for a relay node.

Another object of the present invention is to provide a method of receiving control information for a relay node.

Another object of the present invention is to provide an apparatus for transmitting control information for a relay node.

Another object of the present invention is to provide an apparatus for receiving control information for a relay node.

Another object of the present invention is to provide a method for an eNode B to transmit dedicated system information to a relay node.

Another object of the present invention is to provide an eNode B apparatus for transmitting dedicated system information to a relay node.

Another object of the present invention is to provide a method for a relay node to receive dedicated system information from an eNode B.

A further object of the present invention is to provide a relay node apparatus for receiving dedicated system information from an eNode B.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of transmitting control information for relay node (RN) from an eNode B according to the present invention may include the step of transmitting information on a resource region of relay-physical downlink control channel (R-PDCCH) including the control information for each of at least one RN and interleaving mode information on an interleaving mode applied to R-PDCCH allocated for each of the at least one RN to the each of the at least one RN, wherein the R-PDCCH of each of the at least one RN is allocated to the resource region, wherein the R-PDCCH of a first RN among the at least one RN is allocated to a first resource region by being applied in a first interleaving mode with the R-PDCCH of another RN, and wherein the R-PDCCH of a second RN among the at least one RN is allocated to a second resource region by being applied in a second interleaving mode with the R-PDCCH of another RN.

Preferably, the resource region information on the resource region having the R-PDCCH of each of the at least one RN applied thereto and the interleaving mode information may be semi-statically configured for each of the at least one RN.

More preferably, the eNode B may transmit the resource region information on the resource region having the R-PDCCH of each of the at least one RN allocated thereto and the interleaving mode information to each of the at least one RN through a higher layer signaling.

More preferably, the R-PDCCH of each of the at least one RN may be allocated by physical resource block (PRB) unit.

Preferably, in the first interleaving mode, the R-PDCCH of the first RN may be interleaved with the R-PDCCH of another relay node allocated to the first resource region by resource element group (REG) unit. And, in the second interleaving mode, the R-PDCCH of the second RN may be interleaved with the R-PDCCH of another RN allocated to the second resource region by REG unit.

To further achieve these and other advantages and in accordance with the purpose of the present invention, an e Node B apparatus for transmitting control information for relay node (RN) according to the present invention may include a transmitter configured to transmit information on a resource region of relay-physical downlink control channel (R-PDCCH) including the control information for each of at least one RN and interleaving mode information on an interleaving mode applied to R-PDCCH allocated for each of the at least one RN to the each of the at least one RN, and a processor configured to allocate the R-PDCCH of a first RN among the at least one RN to a first resource region by being applied in a first interleaving mode with the R-PDCCH of another RN and allocate the R-PDCCH of a second RN among the at least one RN to a second resource region by being applied in a second interleaving mode with the R-PDCCH of another RN.

Preferably, the resource region information on the resource region having the R-PDCCH of each of the at least one RN and the interleaving mode information may be semi-statically configured for each of the at least one RN by the processor.

And, the processor may allocate the R-PDCCH of each of the at least one RN by PRB (physical resource block) unit.

More preferably, the transmitter may transmit the resource region information on the resource region having the R-PDCCH of each of the at least one RN and the interleaving mode information to each of the at least one RN through a higher layer signaling.

To further achieve these and other advantages and in accordance with the purpose of the present invention, a method of receiving control information at a relay node (RN) according to the present invention may include the step of receiving information on a resource region of relay-physical downlink control channel (R-PDCCH) including the control information for the relay node and interleaving mode information on an interleaving mode applied to R-PDCCH of the relay node from an eNode B and performing blindly decoding on the R-PDCCH of the relay node based on the received R-PDCCH resource region information and the received interleaving mode.

To further achieve these and other advantages and in accordance with the purpose of the present invention, a relay node (RN) apparatus for receiving control information according to the present invention may include a receiver configured to receive information on a resource region of relay-physical downlink control channel (R-PDCCH) including the control information for the relay node and interleaving mode information on an interleaving mode applied to R-PDCCH of the relay node from an eNode B and a processor performing blindly decoding on the R-PDCCH of the relay node based on the received R-PDCCH resource region information and the received interleaving mode information.

To further achieve these and other advantages and in accordance with the purpose of the present invention, a method of transmitting system information from an eNode B according to the present invention may include the step of transmitting resource allocation information for transmitting dedicated system information for each relay node to the each relay node through relay-physical downlink control channel (R-PDCCH) allocated to the each relay node, wherein the dedicated system information is carried on a prescribed relay-physical downlink shared channel (R-PDSCH) common to the each relay node or each R-PDSCH discriminated not to overlap with the each relay node.

To further achieve these and other advantages and in accordance with the purpose of the present invention, an eNode B apparatus for transmitting system information according to the present invention may include a transmitter configured to transmit resource allocation information for transmitting dedicated system information to each relay node to the each relay node on relay-physical downlink control channel (R-PDCCH) allocated to the each relay node and a processor controlling the dedicated system information to be carried on a prescribed relay-physical downlink shared channel (R-PDSCH) common to the each relay node or each R-PDSCH discriminated not to overlap with the each relay node.

To further achieve these and other advantages and in accordance with the purpose of the present invention, a method of receiving system information at a relay node (RN) according to the present invention may include the steps of receiving resource allocation information for transmitting dedicated system information of the relay node from an eNode B through relay-physical downlink control channel (R-PDCCH) of the relay node and receiving the dedicated system information of the relay node on relay-physical downlink shared channel (R-PDSCH) indicated by the resource allocation information, wherein the indicated R-PDSCH comprises a prescribed R-PDSCH in common with the dedicated system information on another relay node or an R-PDSCH different from that of the dedicated system information of the another relay node.

To further achieve these and other advantages and in accordance with the purpose of the present invention, a relay node apparatus for receiving system information according to the present invention may include a receiver configured to receive resource allocation information for transmitting dedicated system information of the relay node through relay-physical downlink control channel (R-PDCCH) of the relay node from an eNode B and a receiver configured to receive the dedicated system information of the relay node on relay-physical downlink shared channel (R-PDSCH) indicated by the resource allocation information, wherein the indicated R-PDSCH comprises a prescribed R-PDSCH in common with the dedicated system information on another relay node or an R-PDSCH different from that of the dedicated system information of the another relay node.

Advantageous Effects

According to the present invention, an eNode B efficiently allocates a resource for transmission of control information for a relay node and a resource for transmission of system information for a relay node and enables the relay node to accurately detect the control information and the system information.

According to the present invention, a relay node may be able to detect control information accurately and quickly using resource allocation and the like received from an eNode B.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram for structures of downlink and uplink subframe in 3GPP LTE system as one example of a mobile communication system;

FIG. 9 is a diagram for one example of a method for an eNode B to allocate a control channel for a relay node to each relay node in a specific backhaul subframe frequency-domain-specifically.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like.

In a mobile communication system, a user equipment/relay node is able to receive information in downlink/backhaul downlink and is able to transmit information in uplink/backhaul uplink as well. Information transmitted or received by the user equipment/relay node may include various kinds of data and control information. In accordance with types and usages of the information transmitted or received by the user equipment/relay node, various physical channels may exist.

Figure 1:
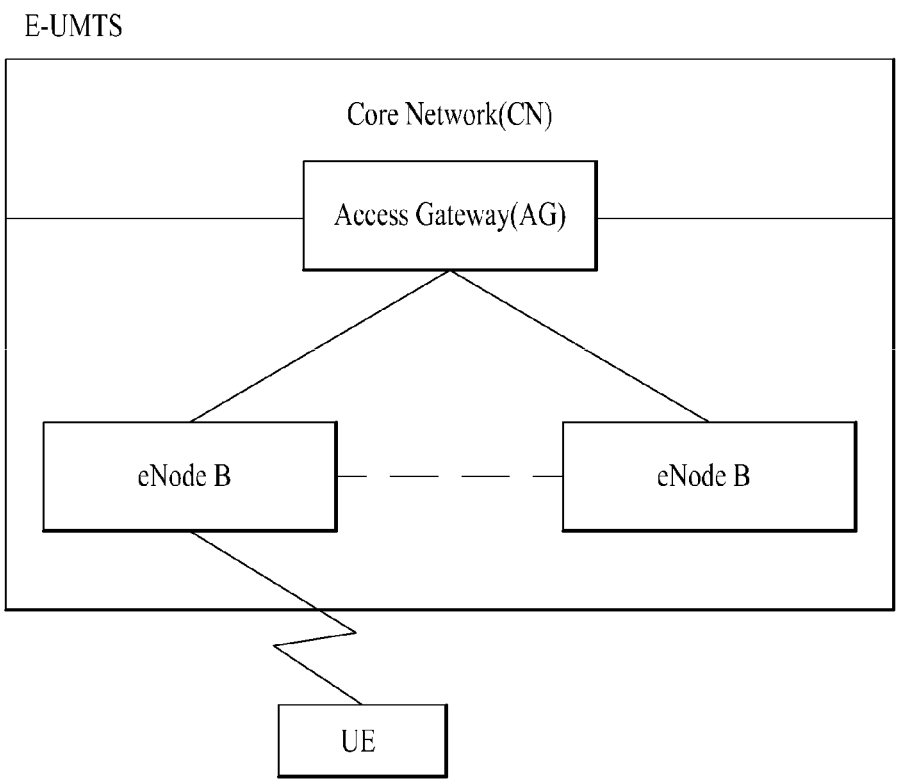
FIG. 1 is a schematic diagram of E-UMTS network structure as an example of a mobile communication system.
Figure 2:
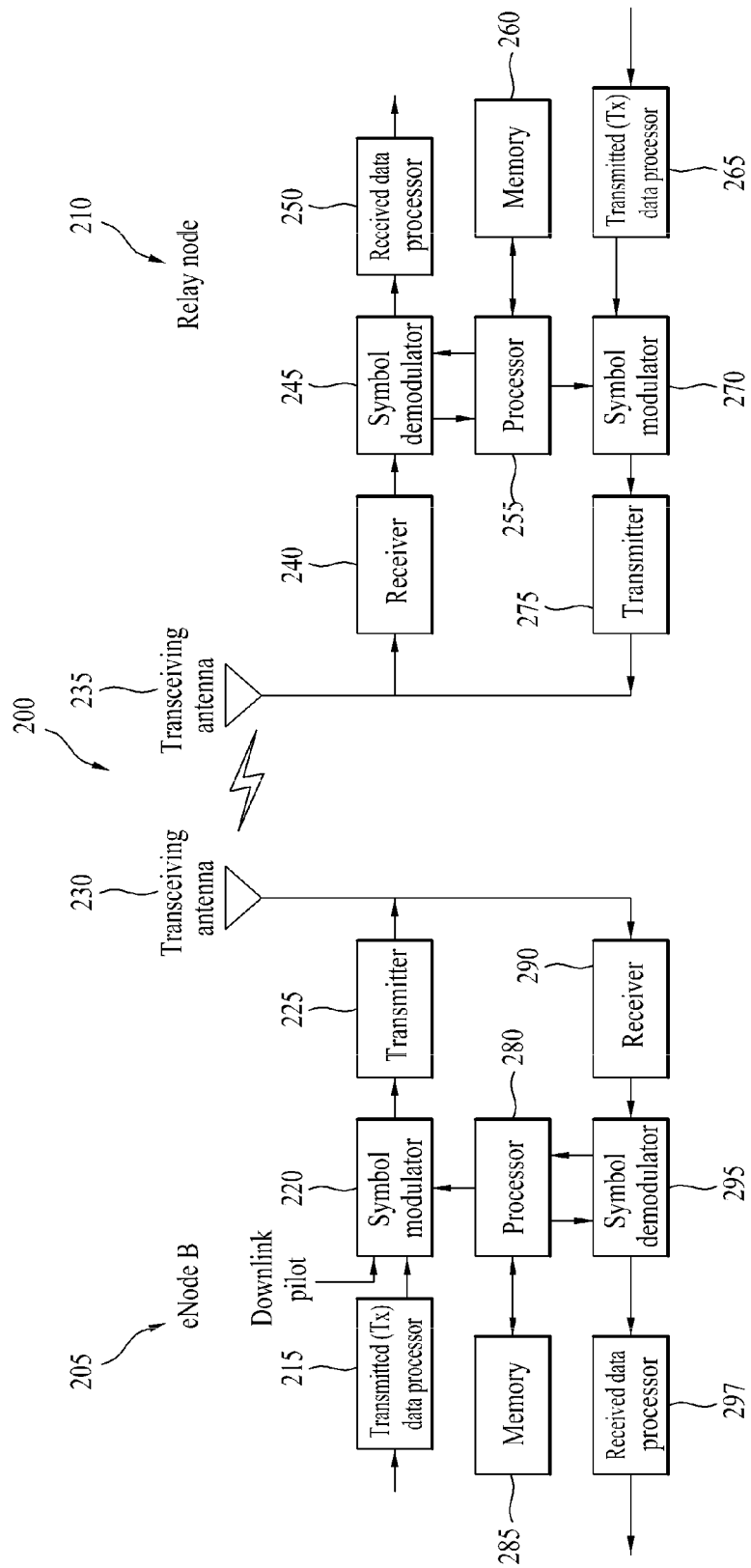
FIG. 2 is a block diagram for configurations of an eNode B 205 and a relay node 210 in a wireless communication system 200 according to the present invention.

FIG. 2 is a block diagram for configurations of an eNode B 205 and a relay node 210 in a wireless communication system 200 according to the present invention.

Although one eNode B 205 and one relay node 210 are shown in the drawing to schematically represent a wireless communication system 200, the wireless communication system 200 may include at least one eNode B and/or at least one relay node.

Referring to FIG. 2, an eNode B 205 may include a transmitted (Tx) data processor 215, a symbol modulator 220, a transmitter 225, a transceiving antenna 230, a processor 280, a memory 285, a receiver 290, a symbol demodulator 295 and a received data processor 297. A relay node 210 may include a transmitted (Tx) data processor 265, a symbol modulator 270, a transmitter 275, a transceiving antenna 235, a processor 255, a memory 260, a receiver 240, a symbol demodulator 255 and a received data processor 250. Although the eNode B/relay node 205/210 includes one antenna 230/235 in the drawing, each of the eNode B 205 and the relay node 210 may include a plurality of antennas. Therefore, each of the eNode B 205 and the relay node 210 supports MIMO (multiple input multiple output) system. And, the eNode B 205 according to the present invention may support both SU-MIMO (single user-MIMO) and MU-MIMO (multi user-MIMO).

In downlink, the transmitted data processor 215 receives traffic data, codes the received traffic data by formatting the received traffic data, interleaves the coded traffic data, modulates (or symbol maps) the interleaved data, and then provides modulated symbols (data symbols). The symbol modulator 220 provides a stream of symbols by receiving and processing the data symbols and pilot symbols.

The symbol modulator 220 multiplexes the data and pilot symbols together and then transmits the multiplexed symbols to the transmitter 225. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 225 receives the stream of the symbols, converts the received stream to at least one or more analog signals, additionally adjusts the analog signals (e.g., amplification, filtering, frequency upconverting), and generates a downlink signal suitable for a transmission on a radio channel. Subsequently, the downlink signal is transmitted to the relay node via the antenna 230.

In the configuration of the relay node 210, the antenna 235 receives the downlink signal from the eNode B and then provides the received signal to the receiver 240. The receiver 240 adjusts the received signal (e.g., filtering, amplification and frequency downconverting), digitizes the adjusted signal, and then obtains samples. The symbol demodulator 245 demodulates the received pilot symbols and then provides them to the processor 255 for channel estimation.

The symbol demodulator 245 receives a frequency response estimated value for downlink from the processor 255, performs data demodulation on the received data symbols, obtains data symbol estimated values (i.e., estimated values of the transmitted data symbols), and then provides the data symbols estimated values to the received (Rx) data processor 250. The received data processor 250 reconstructs the transmitted traffic data by performing demodulation (i.e., symbol demapping, deinterleaving and decoding) on the data symbol estimated values.

The processing by the symbol demodulator 245 and the processing by the received data processor 250 are complementary to the processing by the symbol modulator 220 and the processing by the transmitted data processor 215 in the eNode B 205, respectively.

In the relay node 210 in uplink, the transmitted data processor 265 processes the traffic data and then provides data symbols. The symbol modulator 270 receives the data symbols, multiplexes the received data symbols, performs modulation on the multiplexed symbols, and then provides a stream of the symbols to the transmitter 275. The transmitter 275 receives the stream of the symbols, processes the received stream, and generates an uplink signal. This uplink signal is then transmitted to the eNode B 205 via the antenna 135.

In the eNode B 205, the uplink signal is received from the relay node 210 via the antenna 230. The receiver 290 processes the received uplink signal and then obtains samples. Subsequently, the symbol demodulator 295 processes the samples and then provides pilot symbols received in uplink and a data symbol estimated value. The received data processor 297 processes the data symbol estimated value and then reconstructs the traffic data transmitted from the relay node 210.

The processor 255/280 of the relay node/eNode B 210/205 directs operations (e.g., control, adjustment, management, etc.) of the relay node/eNode B 210/205. The processor 255/280 may be connected to the memory unit 260/285 configured to store program codes and data. The memory 260/285 is connected to the processor 255/280 to store operating systems, applications and general files.

The processor 255/280 may be called one of a controller, a microcontroller, a microprocessor, a microcomputer and the like. And, the processor 255/280 may be implemented using hardware, firmware, software and/or any combinations thereof. In the implementation by hardware, the processor 255/280 may be provided with one of ASICs (application specific integrated circuits), DSPs (digital signal processors), DSPDs (digital signal processing devices), PLDs (programmable logic devices), FPGAs (field programmable gate arrays), and the like. In case of the implementation by firmware or software, firmware or software can be configured to include modules, procedures, and/or functions for performing the above-explained functions or operations of the present invention. And, the firmware or software configured to implement the present invention is loaded in the processor 255/280 or saved in the memory 260/285 to be driven by the processor 255/280.

Layers of a radio protocol between a relay node and an eNode B may be classified into $1^{st}$ layer L1, $2^{nd}$ layer L2 and $3^{rd}$ layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resourced between UE and network. A relay node and an eNode B may be able to exchange RRC messages with each other via radio communication layer and RRC layers.

Figure 3:
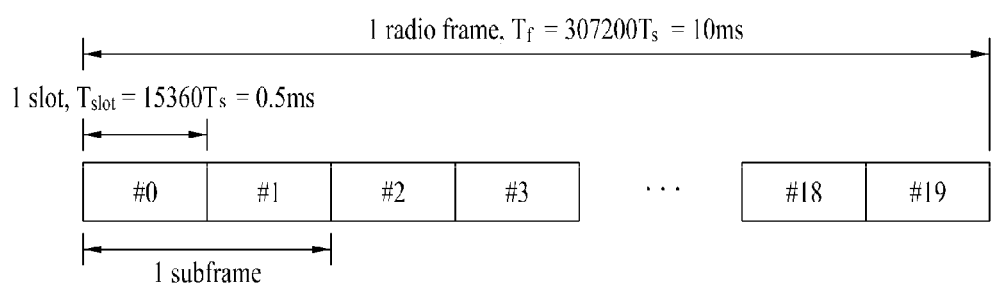
FIG. 3 is a diagram for one example of a structure of a radio frame used in 3GPP LTE system as one example of a mobile communication system.

FIG. 3 is a diagram for one example of a structure of a radio frame used in 3GPP LTE system as one example of a mobile communication system.

Referring to FIG. 3, one radio frame has a length of 10 ms (327200·$T_s$) and is constructed with 10 subframes in equal size. Each of the subframes has a length of 1 ms and is constructed with two slots. Each of the slots has a length of 0.5 ms (15360·$T_s$). In this case, $T_s$ indicates a sampling time and is expressed as $T_s=1/(15\ kHz\times2048)=3.2552\times10^{-8}$ (about 33 ns). The slot includes a plurality of OFDM symbols or SC-FDMA symbols in a time domain and also includes a plurality of resource blocks (RBs) in a frequency domain.

In the LTE system, one resource block (RB) includes '12 subcarriers×7 or 6 OFDM or SC-FDMA (single carrier—frequency division multiple access) symbols'. A transmission time interval (hereinafter abbreviated TTI), which is a unit time for transmitting data, can be determined by at least one subframe unit. The above-described structure of the radio frame is just exemplary. And, the number of subframes included in a radio frame, the number of slots included in a subframe and/or the number of OFDM or SC-FDMA symbols included in a slot may be modified in various ways.

FIG. 4 is a diagram for structures of downlink and uplink subframe in 3GPP LTE system as one example of a mobile communication system.

Referring to FIG. 4 (a), one downlink (hereinafter abbreviated DL) subframe includes 2 slots in a time domain. Maximum 3 fore OFDM symbols of the first slot within the DL subframe correspond to a control region for allocating control channels thereto and the rest of the OFDM symbols correspond to a data zone for allocating PDSCH (physical downlink shared channel) thereto.

DL control channels used in 3GPP LTE system or the like include PCFICH (physical control format indicator channel), PDCCH (physical downlink control channel), PHICH (physical hybrid-ARQ indicator channel), etc. The PCFICH carried on a first OFDM symbol carries the information on the number of OFDM symbols (i.e., a size of a control region) used for the transmission of control channels within a subframe. The control information carried on the PDCCH is called downlink control information (hereinafter abbreviated DCI). The DCI indicates UL resource allocation information, DL resource allocation information, a UL transmission power control command for random user equipment groups and the like. The PHICH carries ACK/NACK (acknowledgement/negative acknowledgement) signal for UL HARQ (hybrid automatic repeat request). In particular, the ACK/NACK signal for UL data transmitted by a user equipment is carried on PHICH.

In the following description, PDCCH of DL physical channel is explained.

First of all, an eNode B is able to transmit resource allocation and transmission format (this is called DL grant) of PDSCH, resource allocation information (this is called UL grant) of a physical UL shared channel, an aggregation of transmission power control commands for a random user equipment and individual user equipments in a group, activation of VoIP (voice over internet protocol) and the like via PDCCH. A plurality of PDCCHs can be transmitted within a control region and a user equipment is able to monitor a plurality of the PDCCHs. The PDCCH is constructed with aggregation of one or several contiguous CCEs (control channel elements). The PDCCH constructed with the aggregation of one or several CCEs and can be transmitted via the control region after completion of subblock interleaving. The CCE is a logical allocation unit used to provide the PDCCH with a coding rate in accordance with a status of a radio channel. The CCE corresponds to a plurality of resource element groups. The format of the PDCCH and the bit number of available PDCCH are determined in accordance with the correlation between the number of CCEs and the coding rate provided by the CCEs.

The control information carried on the PDCCH is called DL control information (hereinafter abbreviated DCI). Table 1 shows the DCI according to DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

Referring to Table 1, DCI format 0 indicates UL resource allocation information, DCI formats 1~2 indicate DL resource allocation information, and DCI format 3 or 3A indicates a transmission power control (hereinafter abbreviated TPC) command for random UE groups.

A scheme for an eNode B to map a resource for PDCCH transmission in LTE system is schematically described as follows.

First of all, an eNode B is generally able to transmit scheduling allocation information and other control information on PDCCH. A physical control channel can be transmitted as one aggregation or a plurality of contiguous control channel elements (CCEs). In this case, one control channel element (hereinafter abbreviated CCE) includes 9 resource element groups (REGs). The number of REGs failing to be allocated to PCFICH (physical control format indicator channel) or PHICH (physical hybrid automatic repeat request indicator channel) is $N_{REG}$. The number of CCEs available for a system ranges 0 to '$N_{CCE}-1$', where $N_{CCE}=\lfloor N_{REG}/9 \rfloor$. The PDCCH supports such a multiple format as shown in Table 2. One PDCCH including n contiguous CCEs starts with a CCE that executes 'i mod n=0', where 'i' is a CCE number. Multiple PDCCHs can be transmitted as one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, an eNode B is able to determine a PDCCH format in accordance with how many regions will receive control information and the like. And, a user equipment is able to reduce overhead by reading the control information and the like by CCE unit. Likewise, a relay node may be able to read control information and the like by R-CCE unit. In LTE-A system, it may be able to map a resource element (RE) by R-CCE (relay-control channel element) unit in order to transmit R-PDCCH for a random relay node.

Referring to FIG. 4 (b), a UL subframe can be divided into a control region and a data region in a frequency domain. The control region is allocated to a physical UL control channel (PUCCH) carrying UL control information. And, the data region is allocated to a physical UL shared channel (PUSCH) for carrying user data. In order to maintain the single charier property, one user equipment does not transmit PUCCH and PUSCH simultaneously. PUCCH for one user equipment is allocated as an RB pair in one subframe. RBs belonging to the RB pair occupy different subcarriers in two slots, respectively. And, frequency hopping is performed on the RB pair allocated to the PUCCH on a slot boundary.

Figure 5:
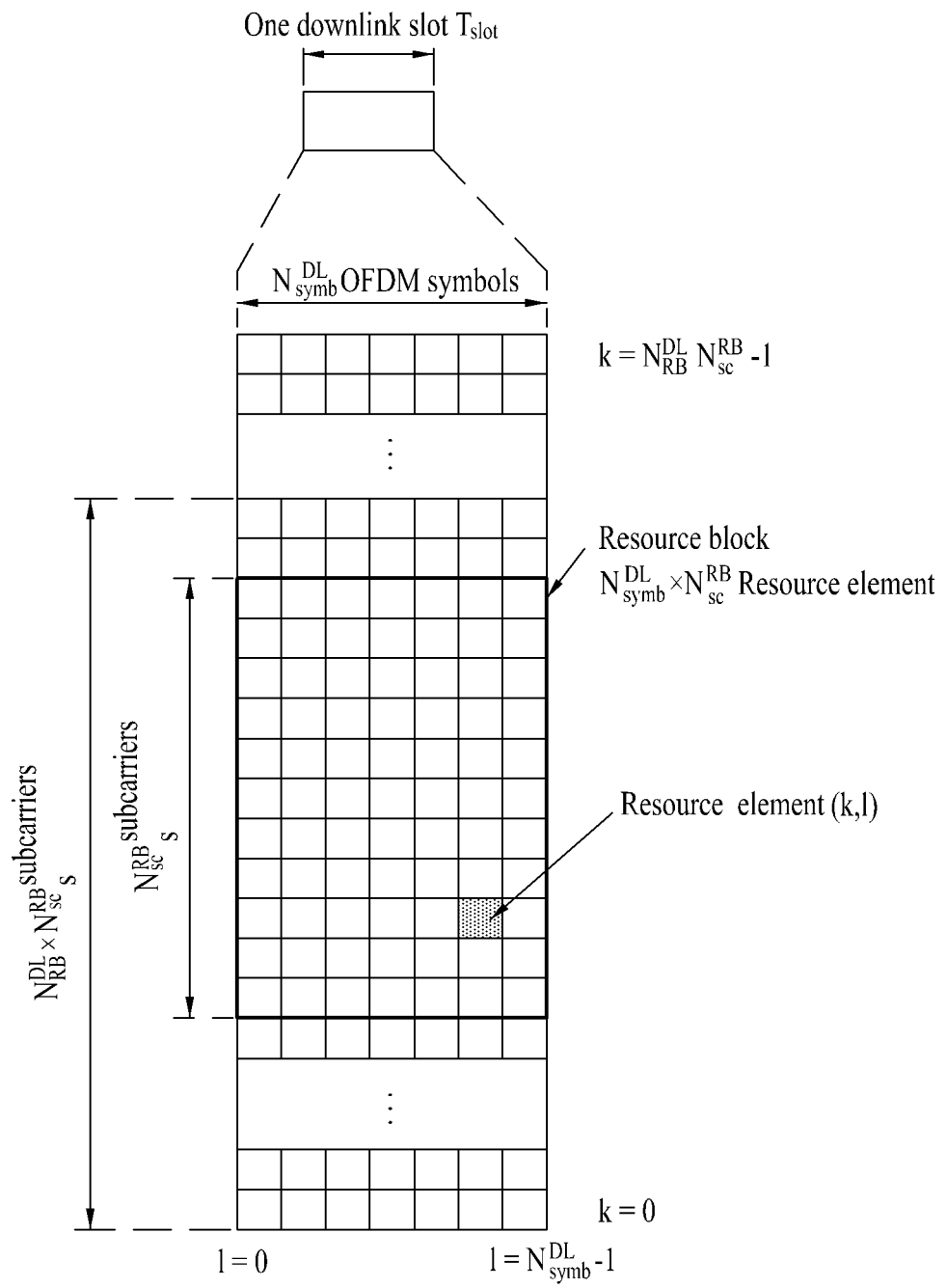
FIG. 5 is a diagram of a time-frequency resource grid structure used by the present invention.

FIG. 5 is a diagram of a downlink time-frequency resource grid structure used by the present invention.

Referring to FIG. 5, a DL signal transmitted in each slot uses a resource grid structure constructed with $N_{RB}^{DL} * N_{SC}^{RB}$ subcarriers and $N_{symb}^{DL}$ OFDM (Orthogonal Frequency Division Multiplexing) symbols. In this case, '$N_{RB}^{DL}$' indicates the number of resource blocks (RBs) in DL, '$N_{SC}^{RB}$' indicates the number of subcarriers constructing one RB, and '$N_{symb}^{DL}$' indicates the number of OFDM symbols in one DL slot. A size of '$N_{RB}^{DL}$' varies in accordance with a DL transmission bandwidth configured within a cell and should meet '$N_{RB}^{min,DL} \leq N_{RB}^{DL} \leq N_{RB}^{max,DL}$'. In this case, '$N_{RB}^{min,DL}$' is a smallest DL bandwidth supported by a wireless communication system and '$N_{RB}^{max,DL}$' is a greatest DL bandwidth supported by the wireless communication system. It may become '$N_{RB}^{min,DL}=6$' and '$N_{RB}^{max,DL}=110$', by which the present example is non-limited. The number of the OFDM symbols included in one slot can vary in accordance with a length of a CP (cyclic prefix) and an interval of subcarrier. In case of multi-antenna transmission, one resource grid can be defined for each antenna port.

Each element within the resource grid for each antenna port is called a resource element (hereinafter abbreviated RE) and is uniquely identified by an index pair (k, l) within a slot. In this case, 'k' is an index in a frequency domain and 'l' is an index in a time domain. The 'k' has a value selected from '0, . . . , $N_{RB}^{DL}N_{SC}^{RB}-1$' and the 'l' has a value selected from '0, . . . , $N_{symb}^{DL}-1$'.

The resource block shown in FIG. 5 is used to describe the mapping relation between a prescribed physical channel and resource elements. Resource blocks can be classified into physical resource blocks (PRBs) and virtual resource blocks (VRBs). One PRB can be defined by $N_{symb}^{DL}$ contiguous OFDM symbols in time domain and $N_{SC}^{RB}$ contiguous subcarriers in frequency domain. In this case, '$N_{symb}^{DL}$' and '$N_{SC}^{RB}$' can be given as shown in Table 3. Hence, one PRB is constructed with '$N_{symb}^{DL} \times N_{SC}^{RB}$' resource elements. One PRB corresponds to one slot in time domain and also corresponds to 180 kHz in frequency domain, by which the present example is non-limited.

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

PRB has a value ranging 0 to '$N_{RB}^{DL}-1$' in frequency domain. The relation between the PRB number ($n_{PRB}$) in frequency domain and the resource element $$n_{PRB} = \left\lfloor \frac{k}{N_{sc}^{RB}} \right\rfloor,.$$

In this case, a size of the VRB is equal to that of PRB. The VRB can be defined in a manner of being categorized into a localized VRB (hereinafter abbreviated LVRB) and a distributed VRB (hereinafter abbreviated DVRB). For the VRB of each type, a single VRB number '$n_{VRB}$' is allocated to a pair of VRBs in two slots within one subframe.

The VRB can have a size equal to that of the PRB. VRBs of two types can be defined as follows. First of all, the first type is the localized VRB (LVRB). And, the second type is the distributed VRB (DVRB). For the VRB of each of the types, a pair of VRBs is allocated across two slots of one subframe with a single VRB index (hereinafter named a VRB number). In particular, one index selected from the group consisting of 0 to '$N_{RB}^{DL}-1$' is allocated to $N_{RB}^{DL}$ VRBs belonging to a first one of the two slots constructing one subframe. And, one index selected from the group consisting of 0 to '$N_{RB}^{DL}-1$' is allocated to $N_{RB}^{DL}$ VRBs belonging to a second one of the two slots constructing one subframe as well.

As mentioned in the foregoing description with reference to FIGS. 3 to 5, the radio frame structure, the DL and UL subframes, the downlink time-frequency resource grid structure and the like may be applicable between an eNode B and a relay node.

R-PDCCH (relay-physical downlink control channel) used by the present invention may be used to mean a backhaul physical downlink control channel for a relay transmission from an eNode B to a relay node (RN). And, R-PUCCH (relay-physical uplink control channel) used by the present invention may be used to mean a backhaul physical uplink control channel for a relay transmission to an eNode B from a relay node. R-PDSCH (relay-physical downlink shared channel) may be used to mean a backhaul downlink physical data/shared channel for a relay transmission. And, R-PUSCH (relay-physical uplink shared channel) may be used to mean a backhaul uplink physical data/shared channel for a relay transmission. In the following description, a relay used by the present invention is assumed as Half-Duplex relay node incapable of interactive transmission/reception on the same band simultaneously. Yet, a relay node may be non-limited by Half-Duplex relay node.

Figure 6:
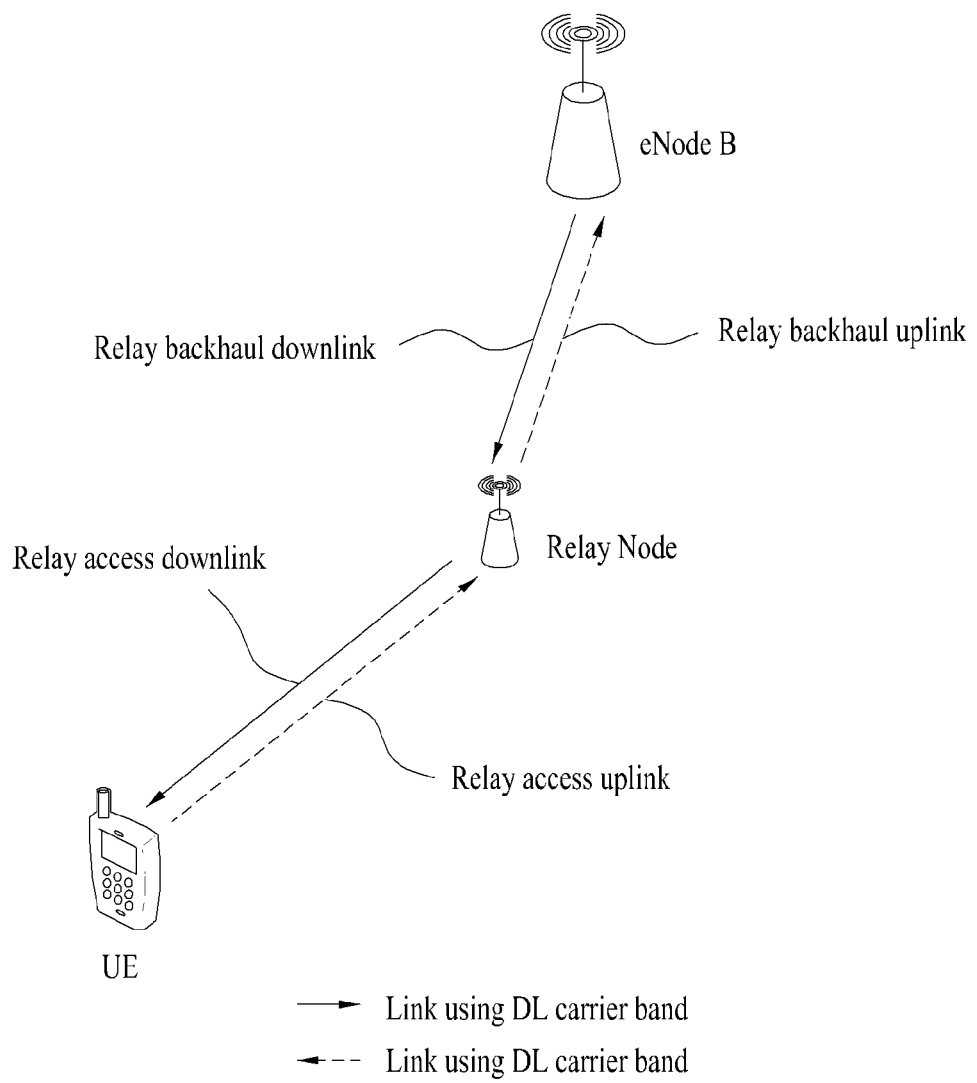
FIG. 6 is a diagram for configurations of relay backhaul link and relay access link in a wireless communication system.

FIG. 6 is a diagram for configurations of relay backhaul link and relay access link in a wireless communication system.

Referring to FIG. 6, a relay node (RN) is introduced as a role of forwarding a link between an eNode B and a user equipment (UE) into in LTE-A system, two types of links differing from each other in attribute are applied to UL carrier frequency band and DL carrier frequency band, respectively. A link part connected between an eNode B and a relay node is represented in a manner of being defined as a backhaul link. If transmission is performed by FDD (frequency division duplex) or TDD (time division duplex) using DL resource, it may be called a backhaul downlink. If transmission is performed by FDD (frequency division duplex) or TDD (time division duplex) using UL resource, it may be called a backhaul uplink.

A relay node may receive information from an eNode B via relay backhaul downlink or may transmit information to the eNode B via relay backhaul uplink. The relay node may transmit information to a user equipment via relay access downlink or may receive information from the user equipment via relay access uplink.

An eNode B may need to set up a new physical control channel for a relay node in addition by maintaining compatibility with LTE Release 8. In this case, the new physical control channel for the relay node will be named R-PDCCH and a data channel for the relay node will be named R-PDSCH. Moreover, a relay zone may include both of the R-PDCCH and the R-PDSCH.

When an eNode B allocates a resource for R-PDCCH in LTE-A system, it may be necessary to consider reliability, scheduling flexibility and decoding latency. In aspect of the reliability, scheduling gain or diversity gain may be obtained for R-PDCCH. Moreover, a relay node may be set to perform blindly decoding on the assigned R-PDCCH or specific R-PDCCH may be assigned to each relay node. In aspect of the scheduling flexibility, an eNode B may be able to dynamically allocate a resource in a relay zone. In aspect of the decoding latency, an eNode B may preferably perform allocation between R-PDCCH and R-PDSCH by time division multiplexing (TDM) rather than frequency division multiplexing (FDM) to reduce the decoding latency. Although the present invention is described on the basis of a case of applying a time division multiplexing scheme as a multiplexing scheme between R-PDCCH and R-PDSCH, it is apparent that the same method may be applicable to a case of applying a frequency division multiplexing scheme.

Figure 7:
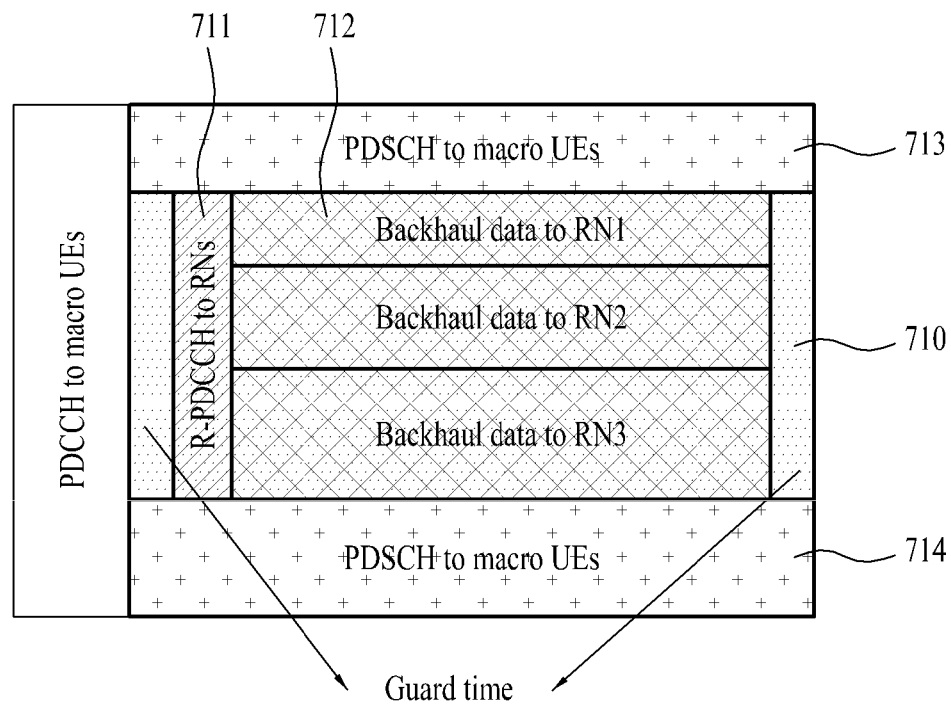
FIG. 7 is a diagram for one example of a method for an eNode B to allocate a relay node zone in a specific backhaul subframe.

FIG. 7 is a diagram for one example of a method for an eNode B to allocate a relay node zone in a specific backhaul subframe.

Referring to FIG. 7, a relay zone 710 includes R-PDCCH 711 and R-PDSCH 712 in a specific backhaul subframe shown in FIG. 7 and may be configured for them in advance. The R-PDCCH 711 and the R-PDSCH 712 may be multiplexed in time domain within one relay zone 710. The eNode B 205 may be able to obtain diversity gain using a method of mapping LTE CCE to RE on the R-PDCCH 711. The processor 255 of the relay node 210 (e.g., RN 1, RN 2 or RN 3 shown in FIG. 7) may be able to detect a region of the R-PDCCH 711 by performing a bind search within the relay zone 710 set in advance.

The R-PDSCH 712 transmitted to the relay nodes, as shown in FIG. 7, is scheduled within the relay zone 710 and a size of the relay zone 710 may not be dynamically adjusted in accordance with a traffic volume for the relay nodes. PDSCH 713/714 transmitted to LTE macro user equipments may not be scheduled in the relay zone 710.

In the following description, a method for an eNode B 205 to semi-statically allocate a relay zone for R-PDCCH is explained with reference to FIG. 8.

Figure 8:
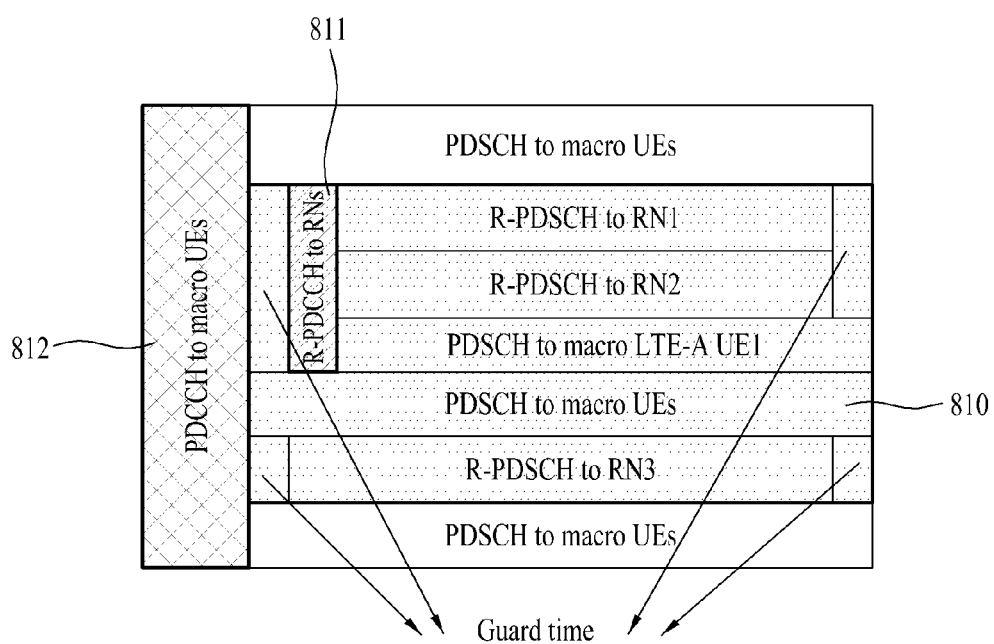
FIG. 8 is a diagram for one example of a method for an eNode B to allocate R-PDCCH to a relay zone semi-statically.

FIG. 8 is a diagram for one example of a method for an eNode B to allocate R-PDCCH to a relay zone semi-statically.

Referring to FIG. 8, a relay zone 810 for the eNode B 205 to allocate R-PDCCH 811 may be previously defined in a specific backhaul subframe shown in FIG. 8. The eNode B 205 may be able to obtain diversity gain using a method of mapping LTE CCE to RE on the R-PDCCH 811.

The eNode B 205 may indicate information on a resource region, to which R-PDCCH (relay-physical downlink control channel) of each relay node is allocated, by including control information for each relay node (e.g., RN 1, RN 2, and RN 3) and an interleaving mode applied to the R-PDCCH allocated per relay node. The relay node 210 (e.g., RN 1, RN 2, and RN 3 shown in FIG. 7) may be able to perform blindly decoding based on the R-PDCCH allocated resource region information and the interleaving mode information on the interleaving mode applied to the allocated to the R-PDCCH, which are received from the eNode B 205. Through this blindly decoding, the relay node 210 may be able to acquire the control information for itself.

R-PDCCH region 811 may include information on a plurality of relay nodes (e.g., RN 1, RN 2, and RN 3) and may be constructed with a plurality of R-PDCCHs. A plurality of the R-PDCCHs for the relay nodes (e.g., RN 1, RN 2, and RN 3) may be interleaved (or subblock interleaved) at REG (resource element group) level in the R-PDCCH region 811.

The processor 255 of the relay node 210 (e.g., RN 1, RN 2, and RN 3) may be able to detect the R-PDCCH region 811 by performing blind search (or decoding) based on the received R-PDCCH resource allocation information within the previously set relay zone 810. The relay node 210 (e.g., RN 1, RN 2, and RN 3 shown in FIG. 8) may be able to perform blind decoding based on the R-PDCCH allocated resource region information received from the eNode B 205 and the information on the interleaving mode applied to the allocated R-PDCCH. Through this blind decoding, the relay node 210 may be able to acquire the control information for itself.

The eNode B 205 may allocate the R-PDSCH within the relay zone 810, as shown in FIG. 8, or may not. The R-PDCCH 811 shown in FIG. 8 carries the control information for the RN 1, RN 2, and RN 3. Within the relay zone 810 shown in FIG. 8, the eNode B 205 may be able to use OFDM symbols, which remain after used for the transmission of the R-PDCCH 711, for the R-PDSCH transmission for the relay node or for the PDSCH transmission for LTE-A user equipment. In this case, when the eNode B 205 transmits R-PDSCH resource allocation information (or LTE-A PDSCH resource allocation information) to each relay node (or each LTE-A user equipment) on the R-PDCCH 811 (or the PDCCH 812), the eNode B 205 may be able to signal information on the punctured or unused OFDM symbol.

OFDM symbols used by the eNode B 205 for the transmission of R-PDCCH 811 to the relay nodes (e.g., RN 1, RN 2, and RN 3) may be fixed. For instance, the eNode B 205 may use the OFDM symbols of indexes 3 to 6 of a $1^{st}$ slot for the transmission of the R-PDCCH 811 to the relay nodes. In doing so, the eNode B 205 may be able to indicate whether a corresponding RB is PRB allocated for the transmission of the R-PDCCH 811 for a specific relay node (e.g., RN 1) or a normal PDSCH region using 1-bit indicator in case of DI resource allocation.

The eNode B 205 may transmit information on OFDM symbol index used for the transmission of the R-PDCCH 811 to each relay node or LTE-A user equipment through higher layer signaling (e.g., RRC signaling) or may broadcast the information on the OFDM symbol index as system information. Alternatively, the eNode B 205 may implicitly fix the OFDM symbol index used for the transmission of the R-PDCCH 811 without signaling. In case that the eNode B 205 implicitly fixes the OFDM symbol index used for the transmission of the R-PDCCH 811, the relay node 210 may be implicitly aware of the OFDM symbol index used for the R-PDCCH 811. The eNode B 205 may be able to signal the punctured or unused OFDM symbol index. In doing so, the eNode B 205 indicates the symbol index by bitmap, indicates the symbol index with a start point and size, or directly signals the corresponding OFDM symbol index.

FIG. 9 is a diagram for one example of a method for an eNode B to allocate a control channel for a relay node to each relay node in a specific backhaul subframe frequency-domain-specifically.

A resource use in specific PRB is described with reference to FIG. 9 as follows. First of all, the eNode B 205 may be able to use at least one OFDM symbol (e.g., OFDM symbols having indexes 3 to 6) in a $1^{st}$ slot of the specific PRB for R-PDCCH transmission of a specific relay node (e.g., one of RN 1, RN 2, and RN 3 shown in FIG. 9). The eNode B 205 may use OFDM symbols, which remain after the use for the R-PDCCH transmission of the specific relay node in the specific PRB, for R-PDSCH transmission of the specific relay node (e.g., RN 1) or for R-PDSCH transmission of another relay node (e.g., RN 2) or LTE-A user equipment. In doing so, the eNode B 205 may use the remaining OFDM symbols by puncturing or rate-matching the OFDM symbols used for the R-PDCCH transmission in the PRB. In this case, when the corresponding R-PDSCH resource allocation information (or LTE-A PDSCH resource allocation information) is transmitted to each relay node (e.g., RN 1, RN 2, and RN 3) (or LTE-A user equipment) on R-PDCCH (or PDCCH), the eNode B 205 defines and uses a new DCI format to signal the information on the punctured or unused OFDM symbol.

As mentioned in the foregoing description, the OFDM symbol index used by the eNode B 205 for the R-PDCCH transmission may be fixed. For instance, OFDM symbols of indexes 3 to 6 in a $1^{st}$ slot of a given PRB may be fixed as symbols to use for the R-PDCCH transmission. In this case, the eNode B 205 may be able to indicate whether the corresponding PRB is the PRB allocated for the R-PDCCH transmission for a specific relay node or a normal PDSCH region using 1-bit indicator in case of DL resource allocation. And, the eNode B 205 may transmit information on OFDM symbol index used for the R-PDCCH transmission to each relay node or LTE-A user equipment through higher layer signaling (e.g., RRC signaling) or may broadcast the information on the OFDM symbol index as system information. Alternatively, the eNode B 205 may implicitly fix the OFDM symbol index used for the transmission of the R-PDCCH 811 without signaling.

On the other hand, the eNode B 205 may be aware of the number of OFDM symbols used for the R-PDCCH transmission by receiving R-PCFICH (physical control format indicator channel) from the eNode B 205. Alternatively, the eNode B 205 may be able to signal the punctured or unused OFDM symbol index to the relay node 210 (e.g., RN 1, RN 2 or RN 3 shown in FIG. 9). For this, within the allocated prescribed PRBs, the eNode B 205 indicates the symbol index for the PDSCH or R-PDSCH transmission by bitmap or may indicate a start point of the PRSCH or R-PDSCH transmission, i.e., a start symbol index.

The eNode B 205 may be able to provide each relay node with control information and data via different frequency region. The eNode B 205 may be able to allocate R-PDCCH for a relay node (e.g., RN 1, RN 2, and RN 3) in a primary backhaul resource region specifically allocated per relay node (e.g., specifically for each of the RN 1, RN 2 and RN 3 shown in FIG. 9). The eNode B 205 may be able to transmit the allocation information of the primary backhaul resource region, which will be explained in the following description, to each relay node (e.g., RN 1, RN 2, and RN 3) through higher layer signaling (e.g., RRC signaling) in case of initial setup and update.

In the following description, contents of the primary backhaul resource region information for each relay node are explained. First of all, the eNode B 205 may be able to allocate a primary backhaul resource per relay node (e.g., RN 1, RN 2, and RN 3) frequency-region-specifically. The eNode B 205 is already aware of information on a start point of the primary backhaul resource allocated per relay node. A method for the eNode B 205 to map a resource for a primary backhaul resource is described in brief. When the eNode B 205 maps a logical RB (or virtual RB) of the primary backhaul resource to a physical resource block (PRB), it may be able to perform the mapping by a localized scheme or a distributed scheme in accordance with a corresponding subframe resource mapping structure. For instance, when the eNode B 205 maps VRB (virtual resource block) of a primary backhaul resource region to PRB, it may set the localized scheme for a fixed relay node (RN) or may set the distributed scheme for a mobile relay node (RN).

If a size (or number of RB) of the primary backhaul resource region is M, the eNode B 205 may allocate logical RB indexes N to (N+M−1) as the primary backhaul resource region, where the logical RB index N is named a start point of the primary backhaul resource. This primary backhaul resource region mapping scheme may be specifically determined for each relay node. In order for the eNode B 205 to secure dynamic property of subframe unit, the primary backhaul resource region mapping scheme may be specifically determined for each subframe instead of determining the primary backhaul resource region mapping scheme specifically for each relay node. If the eNode B 205 specifically maps a resource for each subframe, each relay node may be able to perform blind search (or decoding) on R-PDCCH on the assumption of the mapping by the localized or distributed scheme without separate indication of the resource mapping scheme. In particular, if each relay node fails in the blind decoding of the R-PDCCH of the corresponding primary backhaul resource region on the assumption that the scheme of mapping VRB to PRB is LVRB (localized VRB), it may be able to perform blind decoding on the R-PDCCH of the corresponding primary backhaul resource region on the assumption of DVRB (distributed VRB).

When the R-PDCCH shown in FIG. 9 is allocated, the eNode B 205 may be able to indicate information on the resource region, to which R-PDCCH (relay-physical downlink control channel) of each relay node is allocated, by including control information for each relay node (e.g., RN 1, RN 2, and RN 3) and an interleaving mode applied to the R-PDCCH allocated to each relay node. The eNode B 205 may be able to allocate the R-PDCCH specific to each relay node (e.g., RN 1, RN 2, and RN 3 shown in FIG. 9) by applying interleaving by PRB (physical resource block) unit.

The processor 25 of the relay node 210 (e.g., RN 1, RN 2, and RN 3 shown in FIG. 9) may be able to perform blindly decoding based on the R-PDCCH allocated resource region information and the information on the interleaving mode applied to the allocated R-PDCCH, which are received from the eNode B 205. Through this blindly decoding, the relay node 210 may be able to acquire the control information for itself.

Moreover, referring to FIG. 9, the eNode B 205 may be able to allocate a region for transmitting system information and/or broadcast information for each relay node to the relay zone. In the following description, transmission of information on a resource allocated for the system information and/or broadcast information for each relay node by the eNode B 205 is explained. First of all, the eNode B 205 may be able to transmit resource allocation information for carrying broadcast information and/or system information and information on a transmission cycle for transmitting the broadcast information and/or the system information to each relay node by higher layer signaling (e.g., RRC signaling).

Meanwhile, if the eNode B 205 transmits system information and/or broadcast information (i.e., dedicated system information and/or dedicated broadcast information) for a specific relay node via a corresponding backhaul subframe, it may be able to inform each relay node of the corresponding resource information using RN-specific R-PDCCHs allocated to each primary backhaul resource region. In this case, each relay node may be able to receive the dedicated system information and/or the dedicated broadcast information on R-PDSCH (relay-physical downlink shared channel) indicated by the received resource allocation information. Each relay node may receive the dedicated system information and/or the broadcast information transmitted by the eNode B 205, as shown in FIG. 9, via the broadcast information region (i.e., a prescribed R-PDSCH region common to each relay node) for each relay node. On the other hand, each relay node may receive the dedicated system information and/or broadcast information via R-PDSCH region discriminated by being individually allocated to the corresponding relay node.

On the contrary, the eNode B gives a cell common ID to each relay node for the broadcast information transmission for the corresponding relay node. And, each relay node performs blindly search on the corresponding cell common ID. In this case, RB aggregation level for the corresponding blindly search is cell common information. And, the eNode B 205 may transmit RB aggregation level information to each relay node by higher layer signaling (e.g., RRC signaling) in case of initial setup of the corresponding relay node or may transmit the RB aggregation level information through broadcast information. The eNode B 205 may fix the resource mapping scheme of the control channel for the corresponding broadcast information by the localized scheme or the distributed scheme. The eNode B 205 may inform each relay node of the mapping scheme of the control channel for the broadcast information by higher layer signaling (e.g., RRC signaling).

As mentioned in the foregoing description, the eNode B 205 may be able to allocate specific R-PDCCH for each relay node in the primary backhaul resource region specific to each relay node. Each relay node may receive the primary backhaul resource region by performing blindly search (or decoding) on a whole system frequency band or subband. In this case, the eNode B 205 may be able to set a resource block aggregation level of a primary backhaul resource for the blindly search of each relay node. For instance, the eNode B 205 may be able to set a resource aggregation level (i.e., RB size of the primary backhaul resource region) (e.g., N=1, 2, 3, 4 . . . ) of the primary backhaul resource region in case of the initial setup of the relay node.

When the eNode B 205 maps the corresponding system information and/or broadcast information to PRB from VRB, it may be able to support both DVRB and LVRB. In order to a blindly search count in a relay node, the eNode B 205 may be able to instruct each relay node of a mapping scheme (e.g., a localize or distributed scheme of mapping to PRB from VRB) of a primary backhaul region by higher layer signaling (e.g., RRC signaling) in case of initial setup or update. On the other hand, the eNode B 205 may be able to instruct each relay node of a mapping scheme (e.g., a mapping scheme from VRB to PRB) of the corresponding backhaul subframe by higher layer signaling (e.g., RRC signaling).

In the following description, a method for the eNode B 205 to allocate R-PDCCH in one backhaul subframe by combining the former R-PDCCH allocating methods for the relay node described with reference to FIG. 8 and FIG. 9 is explained.

First of all, the eNode B 205 may be able to allocate R-PDCCH for each relay node group in a relay zone within one backhaul subframe in different ways. In particular, the eNode B 205 discriminates a plurality of relay node groups, each of which includes at least one relay node, from each other in one backhaul subframe and may be then able to apply a different R-PDCCH scheme for each of the relay node groups.

As mentioned in the foregoing description with reference to FIG. 8, the eNode B 205 may be able to configure PRB for R-PDCCH transmission of a $1^{st}$ relay node group (e.g., RN 1, RN 2, and RN 3) semi-statically. And, the eNode B 205 may be able to allocate R-PDCCHs for the relay nodes of the $1^{st}$ relay node group in a specific R-PDCCH region by applying interleaving (or subblock interleaving) at REG (resource element group) level, like LTE Release-8.

As mentioned in the foregoing description with reference to FIG. 9, the eNode B 205 may be able to configure resource allocation (e.g., PRB) for R-PDCCH transmission of a $2^{nd}$ relay node group (e.g., RN 3, RN 4, and RN 5) semi-statically. In this case, the eNode B 205 may allocate R-PDCCH specific to each relay node of the $2^{nd}$ relay node group by a frequency selective method. In particular, the eNode B 205 may be able to allocate R-PDCCH specific to each relay node, as shown in FIG. 9, in a different primary backhaul resource region. And, the eNode B 205 may be able to allocate R-PDCCHs of the relay nodes of the $2^{nd}$ relay node group, which are allocated to different primary backhaul resource regions, respectively, by applying interleaving at PRB level thereto.

As mentioned in the foregoing description, the interleaving mode applied between R-PDCCHs of the relay nodes of the $1^{st}$ relay node group and the interleaving mode applied between R-PDCCHs of the relay nodes of the $2^{nd}$ relay node group may be changeable in-between. For instance, interleaving at PRB level may be applied to the R-PDCCH of the relay nodes of the $1^{st}$ relay node group, while interleaving at REG level may be applied between the R-PDCCHs for the relay nodes of the $2^{nd}$ relay node group.

For this, the eNode B 205 may indicate information on the resource region, to which R-PDCCH for each relay node of the $1^{st}$ and $2^{nd}$ relay node groups is applied, and an interleaving mode applied to the R-PDCCH allocated to each relay node. Each of the relay nodes (RN 1 to RN 6) may be able to perform blindly (or blind) decoding based on the R-PDCCH allocated resource region information and the interleaving mode information applied to the allocated R-PDCCH, which are received from the eNode B 205. Through this blindly decoding, each relay node may be able to acquire control information for itself.

Meanwhile, the eNode B 205 may be able to configure the relay node group in accordance with a type of a relay node. For instance, the eNode B 205 configures the $1^{st}$ relay node group with fixed relay nodes (RNs) and may be then able to transmit the allocated R-PDCCH resource information and the applied interleaving mode information to the fixed relay nodes. The eNode B 205 configures the $2^{nd}$ relay node group with mobile relay nodes (RNs) and may be then able to transmit the allocated R-PDCCH resource information and the applied interleaving mode information to the mobile relay nodes. Subsequently, each of the fixed relay nodes performs blindly decoding (or search) on the R-PDCCH region of the $1^{st}$ relay node group based on the received R-PDCCH allocation information and the received interleaving mode. On the contrary, each of the mobile relay nodes performs blindly decoding (or search) on the R-PDCCH region of the $2^{nd}$ relay node group based on the received R-PDCCH allocation information and the received interleaving mode.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Accordingly, an apparatus for transmitting and receiving control information and system information for a relay node repeater and method thereof are industrially applicable to such a mobile communication system as 3GPP LTE, 3GPP LTE-A, IEEE 802 and the like.

What is claimed is:

1. A method of transmitting control information for a relay node (RN) from an eNode B in a wireless communication system, the method comprising:

transmitting, by the eNode B to the RN, information on a resource region of a relay-physical downlink control channel (R-PDCCH), the transmitted information including the control information for the RN;

transmitting, by the eNode B to the RN, interleaving mode information indicating an interleaving mode applied to the R-PDCCH, wherein the resource region of the R-PDCCH is specifically configured for the RN, and wherein the interleaving mode information further indicates whether the R-PDCCH is transmitted without being interleaved with at least one other R-PDCCH in a physical resource block (PRB) corresponding to the resource region; and transmitting, by the eNode B to the RN, the R-PDCCH and the at least one other R-PDCCH on the PRB based on the indicated interleaving mode, wherein a transmission start orthogonal frequency division multiplexing (OFDM) symbol index of the R-PDCCH is fixed as an OFDM symbol index 3 in the PRB, and wherein the R-PDCCH is transmitted from an OFDM symbol corresponding to the OFDM symbol index 3 in the PRB.

2. The method of claim 1, wherein the information on the resource region of the R-PDCCH and the interleaving mode information are transmitted through a higher layer signaling.

3. The method of claim 2, wherein the R-PDCCH is transmitted on a unit of PRB.

4. An eNode B apparatus for transmitting control information for a relay node (RN) in a wireless communication system, the eNode B apparatus comprising:

a transmitter; and a processor operatively connected to the transmitter and configured to transmit information on a resource region of a relay-physical downlink control channel (R-PDCCH) and interleaving mode information, the transmitted information including the control information for the RN and the interleaving mode information indicating an interleaving mode applied to the R-PDCCH, wherein the resource region of the R-PDCCH is specifically configured for the RN, and wherein the interleaving mode information further indicates whether the R-PDCCH is transmitted without being interleaved with at least one other R-PDCCH in a physical resource block (PRB) corresponding to the resource region, and transmit the R-PDCCH and the at least one other R-PDCCH on the PRB based on the indicated interleaving mode, wherein a transmission start orthogonal frequency division multiplexing (OFDM) symbol index of the R-PDCCH is fixed as an OFDM symbol index 3 in the PRB, and wherein the R-PDCCH is transmitted from an OFDM symbol corresponding to the OFDM symbol index 3 in the PRB.

5. A method of receiving control information at a relay node (RN) from an eNode B in a wireless communication system, the method comprising:

receiving, by the RN from the eNode B, information on a resource region of a relay-physical downlink control channel (R-PDCCH), the received information including the control information for the RN;

receiving, by the RN from the eNode B, interleaving mode information indicating an interleaving mode applied to the R-PDCCH, p1 wherein the resource region of the R-PDCCH is specifically configured for the RN, wherein the interleaving mode information further indicates whether the R-PDCCH is transmitted without being interleaved with at least one other R-PDCCH in a physical resource block (PRB) corresponding to the resource region; and receiving, by the RN from the eNode B, the R-PDCCH based on the information on the resource region of the R-PDCCH and the interleaving mode information, wherein a reception start orthogonal frequency division multiplexing (OFDM) symbol index of the R-PDCCH is fixed as an OFDM symbol index 3 in the PRB, and wherein the R-PDCCH is received from an OFDM symbol corresponding to the OFDM symbol index 3 in the PRB.

6. The method of claim 5, wherein the information on the resource region of the R-PDCCH and the interleaving mode information are received through a higher layer signaling.

7. The method of claim 5, wherein the R-PDCCH is received on a unit of PRB.

8. A relay node (RN) apparatus for receiving control information from an eNode B in a wireless communication system, the RN apparatus comprising:

a receiver; and a processor operatively connected to the receiver, the processor configured to receive, from the eNode B, information on a resource region of a relay-physical downlink control channel (R-PDCCH) and interleaving mode information, the received information including the control information for the RN and the interleaving mode information indicating an interleaving mode applied to the R-PDCCH, wherein the resource region of the R-PDCCH is specifically configured for the RN, and wherein the interleaving mode information further indicates whether the R-PDCCH is transmitted without being interleaved with at least one other R-PDCCH in a physical resource block (PRB) corresponding to the resource region, and receive, from the eNode B, the R-PDCCH based on the information on the resource region of the R-PDCCH and the interleaving mode information, wherein a reception start orthogonal frequency division multiplexing (OFDM) symbol index of the R-PDCCH is fixed as an OFDM symbol index 3 in the PRB, and wherein the R-PDCCH is received from an OFDM symbol corresponding to the OFDM symbol index 3 in the PRB.

9. The method of claim 1, wherein the R-PDCCH is transmitted during OFDM symbols corresponding to the OFDM symbol indexes 3, 4, 5 and 6 in the PRB.

10. The method of claim 1, further comprising:

transmitting a transmission start time of the R-PDCCH.

11. The method of claim 1, further comprising:

transmitting a start OFDM symbol index of a physical shared channel (PDSCH) associated with the R-PDCCH for the RN.

12. The method of claim 11, further comprising:

transmitting the PDSCH to the RN based upon the start OFDM symbol index of the PDSCH.

13. The eNode B apparatus of claim 4, wherein the R-PDCCH is transmitted during OFDM symbols corresponding to the OFDM symbol indexes 3, 4, 5 and 6 in the PRB.

14. The eNode B apparatus of claim 4, wherein the processor is further configured to transmit a transmission start time of the R-PDCCH.

15. The eNode B apparatus of claim 4, wherein the processor is further configured to transmit a start OFDM symbol index of a physical shared channel (PDSCH) associated with the R-PDCCH for the RN.

16. The eNode B apparatus of claim 15, wherein the processor is further configured to transmit the PDSCH to the RN based upon the start OFDM symbol index of the PDSCH.

17. The method of claim 5, wherein the R-PDCCH is received during OFDM symbols corresponding to the OFDM symbol indexes 3, 4, 5 and 6 in the PRB.

18. The method of claim 5, further comprising:

receiving a transmission start time of the R-PDCCH.

19. The method of claim 5, further comprising:

receiving a start OFDM symbol index of a physical shared channel (PDSCH) associated with the R-PDCCH for the RN.

20. The method of claim 19, further comprising:

receiving the PDSCH from the eNode B based upon the start OFDM symbol index of the PDSCH.

21. The RN apparatus of claim 8, wherein the processor is further configured to receive the R-PDCCH during OFDM symbols corresponding to the OFDM symbol indexes 3, 4, 5 and 6 in the PRB.

22. The RN apparatus of claim 8, wherein the processor is further configured to receive a transmission start time of the R-PDCCH.

23. The RN apparatus of claim 8, wherein the processor is further configured to receive a start OFDM symbol index of a physical shared channel (PDSCH) associated with the R-PDCCH for the RN.

24. The RN apparatus of claim 23, wherein the processor is further configured to receive the PDSCH from the eNode B based upon the start OFDM symbol index of the PDSCH.

\* \* \* \* \*